(12) United States Patent
Ritter, III

(10) Patent No.: US 8,801,963 B2
(45) Date of Patent: Aug. 12, 2014

(54) SYNTHESIS OF STANNANE AND DEUTEROSTANNANE

(75) Inventor: Cole J. Ritter, III, Palmer Township, PA (US)

(73) Assignee: Voltaix, LLC, Branchburg, NJ (US)

( * ) Notice: Subject to any disclaimer, the term of this patent is extended or adjusted under 35 U.S.C. 154(b) by 0 days.

(21) Appl. No.: 13/814,665

(22) PCT Filed: Aug. 10, 2011

(86) PCT No.: PCT/US2011/047271
§ 371 (c)(1),
(2), (4) Date: Feb. 6, 2013

(87) PCT Pub. No.: WO2012/021634
PCT Pub. Date: Feb. 16, 2012

(65) Prior Publication Data
US 2013/0129607 A1    May 23, 2013

Related U.S. Application Data

(60) Provisional application No. 61/372,656, filed on Aug. 11, 2010.

(51) Int. Cl.
*C01B 3/04* (2006.01)
*C01B 4/00* (2006.01)
*C01B 6/06* (2006.01)

(52) U.S. Cl.
CPC .... *C01B 6/06* (2013.01); *C01B 4/00* (2013.01)
USPC ............ 252/188.26; 252/188.25; 252/188.27; 423/654; 423/647.7

(58) Field of Classification Search
USPC ............. 423/645, 647.7; 252/188.25, 188.27, 252/188.26
See application file for complete search history.

(56) References Cited

U.S. PATENT DOCUMENTS 3,654,367 A * 4/1972 Reifenberg et al. ........... 564/416

OTHER PUBLICATIONS

"Direct Synthesis of Complex Metal Hydrides", Ashby et al. Aug. 1962, Inorganic Chemistry, p. 499-503.*
"Note on the Simple Collision Theorey of Bimolecular Reaction", Present, Apr. 1955, Physics, p. 415-441.*
Emeleus, et al., "Sodium Derivatives of Stannane," J. Chem. Soc., 1958, pp. 2444-2448.
Schaeffer, et al., "The Preparation of Stannane," J. Am. Chem. Soc. 1954, vol. 76, pp. 1203-1204.
The International Search Report and Written Opinion for PCT Appl. No. PCT/US2011/047271 dated Apr. 9, 2012.

* cited by examiner

*Primary Examiner* — Stanley Silverman
*Assistant Examiner* — Syed Iqbal

(57) ABSTRACT

The present invention relates to a process for the preparation of stannane and deuterostannane by reacting a stannic halide with lithium aluminum hydride or aluminum deuteride respectively in a polydentate solvent.

27 Claims, No Drawings

SYNTHESIS OF STANNANE AND DEUTEROSTANNANE

CROSS-REFERENCE TO RELATED APPLICATIONS

This application is a National Stage Application of PCT/US11/47271 filed Aug. 10, 2011, which claims priority from U.S. Provisional Patent Application No. 61/372,656 filed on Aug. 11, 2010. The priority of both said PCT and U.S. Provisional Patent Application are claimed.

BACKGROUND OF THE INVENTION

The present invention relates to an improved process for the preparation of stannane ($SnH_4$) and deuterostannane ($SnD_4$) from stannic halide and a reducing agent such as lithium aluminum hydride and lithium aluminum deuteride respectively.

Stannane and deuterostannane have been conventionally prepared by reacting stannic halide in the gas phase, neat liquid phase or dispersed in a solvent with a reducing agent, lithium aluminum hydride ($LiAlH_4$) or lithium aluminum deuteride ($LiAlD_4$), respectively in solid form or dispersed in a solvent. Reactions between stannic chloride and these reducing agents are exothermic and the products of the reactions, stannane and deuterostannane, are pyrophoric and the reaction mixtures can deflagrate explosively. These procedures can result in low yields and/or the generation of impurities and the need for purification steps.

A. D. Norman, et al., *Inorganic Syntheses* Vol. 11, 1968, p. 170, prepared $SnH_4$ and $SnD_4$ by controlled addition of an etherate slurry of stannic chloride to a slurry of $LiAlH_4$ or $LiAlD_4$ in the same solvent at −70° C. The reaction mixture is maintained at −60 to −70° C. This process produced a yield of stannane of about 30% and about 25% for deuterostannane. Extra purification steps are required to remove the stannane and deuterostannane from the ether solvent.

A. E. Finholt, et al., *J. Chem. Soc.*, 1947, 69, 2692, prepared $SnH_4$ by distilling stannic chloride in vacuo into a reaction vessel attached to the vacuum system, and was solidified in a liquid nitrogen bath. After admitting gaseous nitrogen to the apparatus, a solution of $LiAlH_4$ in diethyl ether was added. The mixture was allowed to warm without stirring. At about −30° C. the reaction proceeded vigorously. Volatile material was removed from the reaction zone at ten-minute intervals. The mixture thus removed was immediately condensed and solidified in a liquid nitrogen bath. The volatile materials were fractionated several times. The yield of $SnH_4$ was 20.4%.

H. J. Emeleus and S. F. A. Kettle, *J. Chem. Soc.* 1958, 2444-2448, prepared $SnH_4$ via a modification of the method described by Finholt, et al. An ether slurry of the stannic chloride-diethyl ether adduct was transferred into the reaction vessel and frozen in liquid nitrogen. An ether solution of $LiAlH_4$ was subsequently added and frozen. A stream of nitrogen containing 0.1% oxygen to inhibit the decomposition of stannane was passed and the reaction vessel was warmed to −78° C. until the ether was liquid and then warmed to −63.5° C. until the solution was brown. The temperature was allowed to increase gradually (1 hr.) to −20° C., and evolution of stannane was then complete. The authors claim that in a typical run they recovered 6.7 grams of stannane from 22.3 grams of ether adduct with stannic chloride and 10 grams of $LiAlH_4$, which we calculate to be about a 78% yield. Further purification of the stannane from diethyl ether is required.

G. W. Schaeffer, et al., *J. Am. Chem. Soc.* (1954), 76(4), 1203, prepared stannane with yields as high as 84% via sodium borohydride reduction of tin(II) chloride in 0.6 N hydrochloric acid solution. This is an efficient stannane synthesis having a yield as high as 84%. However, the yield drops off sharply as the concentration of tin increases above 1 mg of tin per ml of solution making large batches not practical. At 3 mg of tin per mL of solution the yield of stannane is 37% and at 4 mg per mL of solution the yield is 25%. In addition, it is believed that a small amount of boron hydride impurities may be present in the stannane making it undesirable as a material to be used in microelectronic materials. The crude product was purified by fractionation through a trap maintained at −112° C.

Reifenberg, et al., U.S. Pat. No. 3,867,463; U.S. Pat. No. 3,708,549 and (3) U.S. Pat. No. 3,654,367 describe the preparation of stannane by reacting tin tetrachloride, tin tetrabromide or tin tetraiodide in the presence of a nitrogen atmosphere containing about 0.1% oxygen with $LiAlH_4$. The tin halide is reacted with $LiAlH_4$ and may be carried out with or without an inert diluent solvent. The initial temperature is preferably near −200° C. and is slowly elevated to −70° C. Suitable solvents or diluents may include aliphatic hydrocarbons, aromatic hydrocarbons and ethers. The forgoing may contain carboxylic esters, carboxylic amides and nitrile groups as substituents. Suitable solvents are diethyl ether and tetrahydrofuran. The stannic halide is cryogenically combined with $LiAlH_4$ and slowly warmed to produce stannane. Each patent cites the same example for stannane preparation. Example 1 of these patents describes a reduction of tin tetrachloride with $LiAlH_4$, without solvent and reports a yield of about 87%.

Our laboratory experience in reproducing these methods has resulted in low yields and has periodically resulted in runaway, uncontrolled reactions, which have resulted in deflagration of the reagents and, in some cases, detonations.

SUMMARY OF THE INVENTION

The present invention relates to improvements relating to the process for the direct synthesis of stannane and deuterostannane from a stannic halide and a reducing agent. The batch synthesis described herein produces stannane or deuterostannane in a high yield and purity. The method also controls the exothermic reaction and the mixing of reagents in such a way as to avoid degradation of the product due to heat generation and/or localized excess concentrations of stannic halide and avoids detonations and deflagration.

The present invention involves a method of synthesizing stannane or deuterostannane which comprises:
dissolving stannic halide in a cooled solvent to form a low temperature solution;
forming a mixture of a reducing agent and a solvent;
cooling the reducing agent in a solvent mixture to about 0° C. to about the melting point of the solvent;
adding the stannic halide solution slowly while continuing to cool the stannic halide solution during addition to the reducing agent in solvent under vacuum thereby forming a reaction mixture; and
forming a reaction product;
removing the reaction product from the reaction mixture during the addition of the stannic halide solution;
continuing to remove the reaction product after all of the stannic halide solution has been added and formation of the reaction product is complete; and
collecting the reaction product in one or more cold traps;

wherein the reducing agent is selected from lithium aluminum hydride or lithium aluminum deuteride and the temperature of the one or more cold traps is below the boiling point of the reaction product. Collection of the product may be aided by drawing a vacuum from the outlet of the last cold trap. Collection may also occur by allowing the reaction product to flow from the reaction vessel to the one or more cold traps.

DETAILED DESCRIPTION OF THE INVENTION

The present invention involves a method of synthesizing stannane or deuterostannane which comprises:
dissolving a stannic halide in a cooled solvent to form a low temperature solution;
forming a mixture of a reducing agent and a solvent;
cooling the reducing agent solvent mixture;
adding the stannic halide solution slowly while continuing to cool the stannic halide solution and the reducing agent mixture during addition to the reducing agent in solvent thereby forming a reaction mixture;
forming a reaction product;
removing reaction product from the reaction mixture during the addition of the stannic halide solution;
continuing to remove reaction product after all of the stannic halide solution has been added and formation of the reaction product is complete; and
collecting the reaction product in one or more cold traps;
wherein the reducing agent is selected from lithium aluminum hydride or lithium aluminum deuteride; and
wherein the temperature of at least one of cold traps is below the boiling point of the reaction product.

A preferred method of synthesizing stannane or deuterostannane which comprises:
dissolving stannic halide in a cooled solvent to form a low temperature solution;
forming a mixture of a reducing agent and a solvent;
cooling the reducing agent to about 0° C. to about the melting point of the solvent;
adding the stannic halide solution slowly to the reducing agent mixture under vacuum;
thereby forming a reaction mixture and stannane or deuterostannane; and
cooling the stannic halide solution and the reducing agent mixture during addition of the stannic halide solution to the reducing agent in solvent;
removing the reaction product from the reaction mixture during the addition of the stannic halide solution;
continuing to remove the reaction product after all of the stannic halide solution has been added and formation of the reaction product is complete;
collecting the reaction product in one or more cold traps; and
wherein the reducing agent is selected from lithium aluminum hydride or lithium aluminum deuteride and the temperature of at least one or more cold traps is cooled below the boiling point of the reaction product and the reaction mixture is stirred during the addition of stannic halide to reducing agent and until the reaction is complete. Collection of the stannic halide product may be aided by drawing a vacuum from the outlet of the last cold trap. Collection may also occur by allowing the reaction product to flow from the reaction vessel to the one or more cold traps. When $LiAlH_4$ is the reducing agent, the product is stannane. When $LiAlD_4$ is the reducing agent, the product is deuterostannane.

The cold traps may be static vacuum traps or flow through (dynamic vacuum) traps. Preferably, one or more of the cold traps is at about −190° C. and more preferably at liquid nitrogen bath temperatures. When more than one cold trap is used, the last cold trap has a temperature below the boiling point of the product, preferably at about −190° C. or less. When more that one cold trap is used, a trap before the last trap is set at a temperature to capture any chemicals with a higher boiling point than either stannane or deuterostannane. Preferably, the trap or traps will have a temperature of about −60° C. to about −80° C. to capture any higher boiling point materials such as solvent. The temperature at which these traps or collectors is maintained depend on the physical properties of any given solvent.

The stannic halide of the present invention is selected from the group consisting of stannic fluoride, stannic chloride, stannic bromide and stannic iodide. The stannic halide is preferably selected from the group consisting of stannic chloride, stannic bromide and stannic iodide. Most preferably the stannic halide is stannic chloride.

The solvents of the present invention are polydentate solvents that are liquids at about −10° C. in which stannic halide is soluble and $LiAlH_4$ and $LiAlD_4$ are at least partially soluble. Partial solubility is defined as about 0.1 gram or more of the reducing agent will dissolve in one liter of solvent. Preferably about 1 gram or more of reducing agent will dissolve in one liter of solvent and more preferably about 3 grams or more of the reducing agent will dissolve in one liter of solvent. Preferred solvents are poly-ethers, glymes (ethylene glycol dimethyl ethers), butyl glymes, proglymes and crown ethers. Preferred ethylene glycol dimethyl ethers are selected from the group consisting of monoglyme, diglyme, triglyme, tetraglyme and butyl glymes. Diglyme is the preferred ethylene glycol ether. It is believed that these solvents form Lewis acid base complexes with the stannic halide which stabilize the stannic halide and optimize the reaction between the stannic halide and the reducing agent.

The batch synthesis described herein produces stannane or deuterostannane in a high yield and high purity. The method also controls the exothermic reaction in such a way as to avoid degradation of the product because of high heat and also avoids detonations and deflagration.

A method of the present invention comprises dissolving stannic halide in solvent at a low temperature of about 0° C. to the melting point of the solvent to form a solution. The solvent is kept in its liquid state. Preferably the stannic halide is dissolved in a solvent having a temperature of about 0° C. to about −64° C. to form a solution. Adding the stannic halide solution to reducing agent in solvent under vacuum to form the reaction mixture. Alternatively, the reaction may be run at ambient pressure under an inert atmosphere. The reducing agent is present in a stoichiometric ratio to about 50 mole percent excess of the amount of reducing agent required to hydrogenate (reduce) all of the stannic halide being added. Preferably, the reducing agent is present in a stoichiometric ratio to about 30 mole percent excess of the amount of reducing agent required to hydrogenate (reduce) all of the stannic halide being added. Preferably, the reaction mixture is stirred during the addition of the stannic halide to the reducing agent and stirring is continued until the reaction is complete and either stannane or deuterostannane are no longer being produced by the reaction mixture. The addition of stannic halide solution to the reducing agent is carried out slowly to avoid excessive heating of the reaction mixture and also to avoid localized excesses of stannic halide relative to reducing agent. Preferably, the stannic halide solution is added uniformly over a period of time. Typically, the stannic halide solution is added at a uniform rate or in about uniform increments to avoid excess heating or localized excesses of stannic halide. In the size of batches reported herein, this addition can take from about 30 minutes to an hour or two or more. When added in intervals, intervals are about 0.1 minute to about 10 minutes apart. Preferably the intervals are about 0.1 to about 5 minutes apart. One skilled in this art can adjust the rate of addition to avoid excess heating of the reaction mixture and avoid localized excess stannic halide in the reaction mixture.

When the reaction is run under vacuum, the vacuum in the system is about 1 Torr to about 100 Torr. Preferably the stannic halide solution is cooled to about 0° C. to about −40° C. during addition to the reducing agent. More preferably cool the stannic halide solution to about −30° C. to about −40° C. during addition to the reducing agent. It is preferable to remove the stannane or deuterostannane immediately as it is formed by exposing the gaseous species in the reactor to one or more traps cooled to a temperature below the boiling point of the stannane or deuterostannane under static or dynamic vacuum.

The reducing agent is cooled to about 0° C. to about the melting point of the solvent and the solvent must not solidify. Preferably, the reducing agent is cooled to about 0° C. to about −70° C. during the addition of stannic halide solution. More preferably, the reducing agent is cooled to about −60° C. to about −70° C. during the addition of stannic halide solution. Stannic halide that is added to the reducing agent forms the reaction mixture. Stannane and deuterostannane form upon mixing of the stannic halide with the reducing agent. The preferred reaction temperatures for the reaction between stannic halide and the reducing agent is from about −70° C. to about room temperature. Preferably, the reaction is initiated at the lower temperature and the temperature in the reaction vessel is allowed to rise after all of the stannic halide has been added to the reducing agent. Initial reaction temperature is preferably about −70° C. to about 0° C. and more preferably about −60° C. to about −10° C. After all of the stannic halide has been added to the reaction vessel, the temperature of the reaction mixture may be held constant or allowed to slowly rise to room temperature. The rate of the temperature rise to ambient room temperature, about 20° C., is not critical and may be achieved through controlled heating or by removing the reaction vessel from the cold bath and allowing the temperature to rise to ambient. It is preferable to continuously stir the reaction mixture until the reaction is complete and stannane or deuterostannane are no longer being produced.

Removal of stannane (or deuterostannane) formed in the reaction is continuous or in intervals of about 0.1 minutes to about 10 minutes from the reaction mixture. Preferably, the intervals are about 1 minute to about 5 minutes apart throughout the entire addition step. More preferably the intervals are about 5 minutes apart. Continuous removal is preferred. The stannane (or deuterostannane) is collected in a one or more cold traps at a temperature below the boiling point of the product. Preferably, the cold traps intended to collect the product are immersed in liquid nitrogen. Any effluent hydrogen or deuterium gas is continuously removed by passing it through the cold traps to the vacuum pump or by venting the system periodically if static traps are used.

Typical yields range from 70-89% (stannic halide basis) and no hydrogen halide contamination is observed via FTIR spectroscopic analysis of gas samples.

The use of polydentate solvents is useful in that they have relatively high boiling points, which allow for facile purification and separation of stannane or deuterostannane as they are formed in the reaction process.

It is believed that polydentate solvents exhibit a stabilization effect on stannic halide and suppress the formation of unstable intermediates that are found in more conventional batch synthesis described in prior art. Furthermore, the formation of unstable intermediates such as Sn (II) oxidation states, which lead to rapid condensation of elemental tin, is suppressed when the stannic halide is dissolved in a polydentate solvent prior to contact with the reducing agent. The preferred polydentate solvents are glymes and the preferred glyme is diglyme.

Example 1

Inventive Batch Synthesis

Stannic chloride (8.20 g, 31.5 mmol) was dissolved in 30 mL of anhydrous diglyme at 0° C. This solution was then added to a 60 mL liquid addition funnel with a cooling jacket. A 500 mL, 3 neck (24/40 joints) round bottom flask was charged with 3.60 g (85.9 mmol) of lithium aluminum deuteride (LiAlD$_4$) and a PTFE-coated magnetic stir egg. The LiAlD$_4$ powder was then slurried in approximately 100 mL of anhydrous diglyme and the liquid addition funnel was attached to the flask. The liquid addition funnel was cooled to between −30° C. and −40° C. and was maintained in this temperature range throughout the addition. The bottom flask was cooled to −65° C. to −72° C. during the reaction. Each component was cooled by using dry ice slurried in isopropyl alcohol. The reaction apparatus was connected to a borosilicate glass Schlenk manifold system and the ambient nitrogen removed in vacuo to a final pressure of approximately 5 torr. The reaction apparatus was connected to a series of two U-traps cooled to −196° C. in liquid nitrogen that was opened to a vacuum pump downstream. The stannic chloride was added drop wise over the course of approximately 40 minutes. The internal reactor pressure was continuously monitored and the volatiles were condensed in the U-traps periodically so that the pressure did not exceed 30 torr. The bottom cold bath was removed once the addition was complete and allowed to slowly warm to approximately −10° C. with continual removal of gas. Most of the product was collected in the first trap and was fractionally condensed into two traps cooled to −78° C. and −196° C. The −78° C. trap contained several drops of diglyme while the −196° C. trap contained 3.56 g of SnD$_4$ (28.1 mmol, 89% yield based on stannic chloride as the limiting reagent). The "toe" of the −196° C. trap was collected in order to check for any HCl impurity due to its lower boiling point in comparison to SnD$_4$. An FTIR gas analysis of the "toe" of the sample was obtained, which showed no HCl and the anticipated spectrum of SnD$_4$. (The "toe" of the sample was obtained by removal of the liquid nitrogen and allowing the SnD4 to thaw and liquefy in which the first 15 torr of gas was collected).

Example 2

Inventive Batch Synthesis

A 500 mL 3-neck round bottom flask containing a PTFE-coated magnetic stir bar was charged with 1.93 g of lithium aluminum deuteride (34.5 mmoles; 50 mole % excess) and 200 mL of anhydrous diglyme. A cold-finger condenser and a 60 mL liquid addition funnel, which contained 6.0 g of stannic chloride (23.0 mmoles) dissolved in 25 mL of anhydrous diglyme, was attached to the reaction flask. The flask and liquid addition funnel with a cooling cup was cooled to −60° C. and −45° C., respectively. The cold-finger condenser was cooled with a dry ice/isopropyl alcohol slush bath at −78° C. to retain the solvent in the reaction flask. The headspace nitrogen was then removed in vacuo to a reactor pressure of approximately 1 torr. The stannic chloride was then added dropwise continuously at a rate of approximately 150 mg $SnCl_4$/minute over the course of 40 minutes to the lithium aluminum deuteride/diglyme mixture. The reaction flask was left open to a glass trap cooled in liquid nitrogen for continuous removal of the volatile gases that were formed (deuterium and deuterostannane gas) during the addition of $SnCl_4$. The pressure in the flask was monitored throughout the reaction and did not exceed 5 torr at any given time. The flask was then allowed to warm to room temperature after the addition of stannic chloride was complete with continuous removal of residual deuterostannane and negligible amounts of deuterium gas. A total of 2.51 g of $SnD_4$ was produced (19.8 mmoles; 86% yield based on $SnCl_4$). A portion of the deuterostannane gas was analyzed via gas-phase FTIR spectroscopy using a 10-cm gas cell with ZnSe plates. The FTIR spectrum revealed the presence of $SnD_4$ exclusively.

Example 3

Non-Inventive Preparation of Deuterostannane from Stannic Chloride (Neat) with $LiAlD_4$ in Diglyme A 1000 mL 3-neck round bottom flask containing a PTFE-coated magnetic stir bar was charged with 12.90 g of lithium aluminum deuteride (288 mmoles; 50 mole % excess) and 500 mL of anhydrous diglyme. A cold-finger condenser and a 60 mL liquid addition funnel, which contained 50.0 g of stannic chloride (192 mmoles), was attached to the reaction flask. The flask was cooled to −55° C. and the headspace nitrogen removed in vacuo to a reactor pressure of approximately 1 torr. The stannic chloride was then added to the lithium aluminum deuteride/diglyme mixture over the course of 75 minutes (addition rate of approximately 700 mg/minute) with periodic removal of the volatile gases that were formed (deuterium and deuterostannane gas). The cold-finger condenser was cooled with a dry ice/isopropyl alcohol slush bath at −78° C. to retain the solvent in the reaction flask. The volatile product was collected in a series of 2 U-traps cooled to −196° C. A significant amount of deuterium gas was formed during the addition of stannic chloride, which was sent to the vacuum pump, and the pressure in the flask was monitored throughout the reaction. The internal pressure of the reaction assembly was not allowed to exceed 50 torr at any given time. The stannic chloride was added in increments of approximately 3 minute intervals followed by condensation of the deuterostannane. The remaining stannic chloride was isolated from the collection of deuterostannane by closing an isolation valve to the liquid addition funnel. The flask was then allowed to warm to room temperature after the addition of stannic chloride was complete with continuous removal of residual deuterostannane and deuterium gas. A total of 3.52 g of $SnD_4$ was produced (27.8 mmoles; 14% yield based on $SnCl_4$). A portion of the deuterostannane gas was analyzed via gas-phase FTIR spectroscopy using a 10-cm gas cell with ZnSe plates. The FTIR spectrum revealed the presence of hydrogen chloride impurity as well as absorption bands attributed to $SnD_4$. Repeated batch syntheses using this method have shown that the product yields vary considerably and rarely approach 15%. Yields of 4-10% are more common using this approach. The addition of the stannic chloride without first dissolving the stannic chloride in a polydentate solvent such as diglyme resulted in a poor yield.

Example 4

Non-Inventive Preparation of Deuterostannane from Stannic Chloride (Neat) with $LiAlD_4$ in Diethyl Ether A 250 mL 3-neck, round bottom flask, containing a PTFE-coated magnetic stir bar, was charged with 3.8 g of $LiAlD_4$ (90.6 mmoles) and 125 mL of anhydrous diethyl ether. The flask was fitted with a cold-finger condenser and a liquid addition funnel that contained 19.6 g of $SnCl_4$ (75.2 mmoles). The flask and cold finger condenser were cooled to −78° C. using powdered dry ice/isopropyl alcohol slush baths and the headspace nitrogen removed in vacuo to a final pressure of approximately 1 torr. The stannic chloride was added over the course of 40 minutes with periodic trapping of the volatile gas that was generated by exposing the reactor to a series of three U-traps cooled in liquid nitrogen. The internal reactor pressure was allowed to increase to approximately 100 torr prior to collection of the $SnD_4$ and removal of the non-condensable deuterium gas. The pressure was reduced to approximately 10 torr in each case prior to the resumption of $SnCl_4$ addition. The cold bath was then removed from the reaction flask once the $SnCl_4$ addition was complete and the flask was allowed to warm to approximately −10° C. with continuous removal of volatile gas that was generated. The condensed $SnD_4$ was then purified by removing small amounts of solvent via fractional condensation (no pumping) using two U-traps that were cooled to −100 (diethyl ether solvent trap) and −196° C. ($SnD_4$ trap). The −100° C. trap contained a small amount of diethyl ether (less than 1 mL) and the −196° C. trap contained $SnD_4$ (1.43 g, 11.3 mmoles, 15% yield). Typical batch syntheses of $SnD_4$ typically resulted in lower yields of approximately 10-12%. This example verifies the low yields reported by Norman, et al.

Example 5

Non-Inventive Preparation of Deuterostannane from Stannic Chloride (Neat) with $LiAlD_4$ in the Absence of Solvent A 500 mL, 2-neck round bottom flask containing a PTFE-coated magnetic stir bar was charged under nitrogen in a glove box with 2.36 g of $LiAlD_4$ (56.3 mmoles). The nitrogen was removed from the flask in vacuo and 10.77 g $SnCl_4$ (41.3 mmoles) was added via condensation by cooling the reaction flask in liquid nitrogen (−196° C.). The liquid nitrogen bath was then removed and the contents allowed to slowly warm to ambient temperature. There was no indication of a reaction taking place after several minutes. The stannic chloride was then removed from the reaction flask via condensation into another glass Schlenk tube. (This was done in order to add more $LiAlD_4$ to the flask in a glove box). The remaining $LiAlD_4$ solid was wetted with residual $SnCl_4$. The flask was then closed to the vacuum source and shaken to knock off solid that had stuck to the stir bar with the intent of further drying the material under vacuum. The wetted solid then deflagrated violently.

Example 6

Non-Inventive Preparation of Deuterostannane from Stannic Chloride (Neat) with $LiAlD_4$ in Diglyme Using a Headspace Cover Gas A 500 mL, 2-neck round-bottom flask with PTFE-coated magnetic stir bar was charged with 3.50 g of $LiAlD_4$ (83.5 mmoles) and 100 mL of anhydrous diglyme. The flask was then fitted with a cold-finger condenser that was cooled to −78° C. The reaction flask was then degassed via freezing and thawing of the reaction slurry. Stannic chloride (10.5 g, 40.3 mmoles) was then condensed into the reaction flask, cooled in a liquid nitrogen bath, followed by pressurizing the system to 1 atmosphere with a headspace cover gas composed of 1000 ppm O₂ in nitrogen. The liquid nitrogen bath was removed and the flask was immersed in a −78° C. dry ice/isopropyl alcohol slush bath. The flask was then allowed to slowly warm to approximately −10° C. during which the internal pressure of the flask increased rapidly. The onset of the pressure increase occurred at approximately −60° C. and the volatiles were collected in a series of 2 U-traps cooled to −196° C. A considerable amount of non-condensable gas was sent to the vacuum pump by slowly passing the entire gas mixture through the U-traps. The build up in pressure during the reaction, as the flask warmed, was maintained at approximately 1 atm by cracking the inlet valve of the adjacent U-trap with the condensation train open to a vacuum pump downstream. The volatiles were completely removed as the temperature of the flask approached −10° C. This experiment resulted in no recovered SnD₄ and a substantial amount of elemental tin left in the reaction pot.

While this invention has been particularly shown and described with references to preferred embodiments thereof, it will be understood by those skilled in the art that various changes in form and details may be made therein without departing from the scope of the invention encompassed by the appended claims.

I claim:

1. A method of synthesizing stannane or deuterostannane which comprises:
   dissolving a stannic halide in a cooled solvent to form a low temperature solution;
   forming a mixture of a reducing agent and a solvent;
   cooling the reducing agent solvent mixture;
   adding the stannic halide solution slowly while continuing to cool the stannic halide solution and the reducing agent mixture during addition to the reducing agent in solvent thereby forming a reaction mixture;
   forming a reaction product;
   removing reaction product from the reaction mixture during the addition of the stannic halide solution;
   removing reaction product after all of the stannic halide solution has been added and formation of the reaction product is complete; and
   collecting the reaction product in one or more cold traps;
   wherein the reducing agent is selected from lithium aluminum hydride or lithium aluminum deuteride and the temperature of at least one of the one or more cold traps is below the boiling point of the reaction product.

2. The method of claim 1 wherein the reducing agent is lithium aluminum hydride and the reaction product is stannane.

3. The method of claim 1 wherein the reducing agent is lithium aluminum deuteride and the reaction product is deuterostannane.

4. The method of claim 1 wherein the stannic halide is selected from the group consisting of stannic fluoride, stannic chloride, stannic bromide and stannic iodide.

5. The method of claim 1 wherein the reducing agent is present in a stoichiometric amount to about 50 mole percent excess than the amount required hydrogenate the stannic halide.

6. The method of claim 1 wherein the stannic halide is dissolved in solvent at a temperature from about 0° C. to the melting point of the solvent.

7. The method of claim 1 wherein the reducing agent solvent mixture is cooled to about 0° C. to about the melting point of the solvent.

8. The method of claim 1 wherein adding the stannic halide solution to the reducing agent mixture to form the reaction mixture is carried under vacuum.

9. The method of claim 1 wherein the stannic halide is dissolved in solvent at a temperature from about 0° C. to about −64° C.

10. The method of claim 1 wherein the reaction mixture temperature during the addition of stannic halide is about 0° C. to about −70° C.

11. The method of claim 1 wherein the reaction mixture temperature is allowed to rise to about 20° C. after addition of the stannic halide to the reducing agent is complete.

12. The method of claim 1 wherein the reaction mixture is continually stirred.

13. The method of claim 1 wherein the stannic halide solution is added to the reducing agent in solvent at a uniform rate such that all of the stannic halide solution is added over about 30 minutes to about 1 hour.

14. The method of claim 1 wherein the stannic halide solution is added to the reducing agent in solvent incrementally over about 30 minutes to about 1 hour.

15. The method of claim 1 wherein the stannic halide solution is added to the reducing agent in solvent incrementally at about 0.1 minute to about 5 minute intervals over about 30 minutes to about 1 hour.

16. The method of claim 1 wherein the solvent is a polydentate solvent.

17. The method of claim 1 wherein the solvent is selected from the group consisting of monoglyme, diglyme, triglyme, tetraglyme, crown ethers, and mixtures thereof.

18. The method of claim 1 wherein the solvent is diglyme.

19. The method of claim 1 wherein the one or more cold traps are static traps.

20. The method of claim 1 wherein the one or more cold traps are flow through traps.

21. The method of claim 1 wherein at least one of the one or more cold traps has a temperature below the boiling point of the reaction product.

22. The method of claim 1 wherein at least one of the one or more cold traps has a temperature about −190° C.

23. The method of claim 1 wherein there is more than one cold trap, the temperature of the last cold trap is about −190° C.

24. The method of claim 1 wherein there is more than one cold trap, the temperature of the first cold trap is about −60° C. to about −80° C.

25. The method of claim 1 wherein the reaction product is removed continually or at intervals.

26. The method of claim 1 wherein the reaction product is removed at about 5 minute intervals.

27. The method of claim 1 wherein the reaction product is removed with the aid of a vacuum being drawn from the exit of the last cold trap.

* * * * *